J. R. DIXON.
Windmills.
No. 211,714. Patented Jan. 28, 1879.
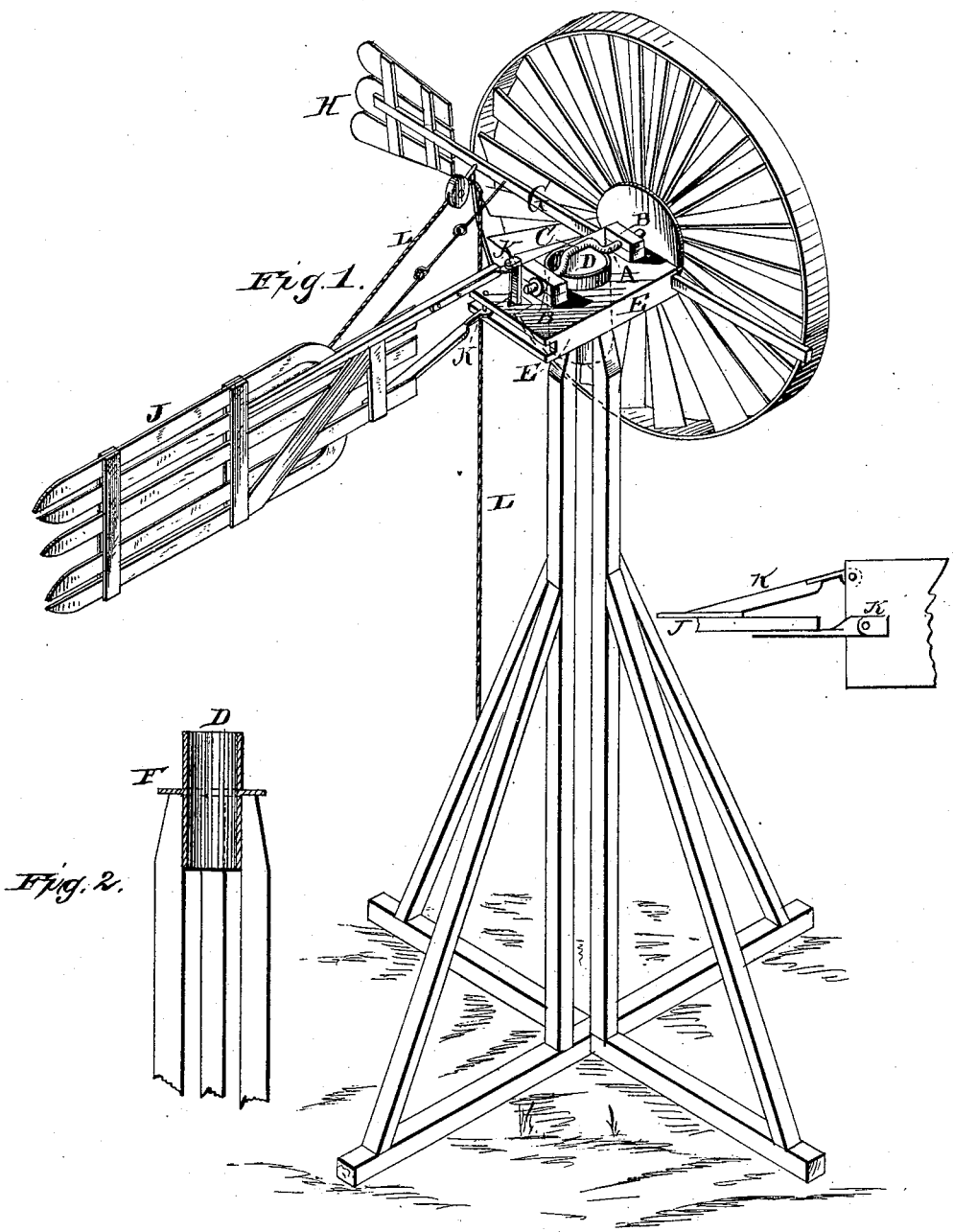

UNITED STATES PATENT OFFICE.

JULIAN R. DIXON, OF FRESNO, CALIFORNIA.

IMPROVEMENT IN WINDMILLS.

Specification forming part of Letters Patent No. 211,714, dated January 28, 1879; application filed November 11, 1878.

*To all whom it may concern:*

Be it known that I, JULIAN R. DIXON, of Fresno, in Fresno county, and in the State of California, have invented certain new and useful Improvements in Windmills; and do hereby declare that the following is a full, clear, and exact description thereof, reference being had to the accompanying drawings, and to the letters of reference marked thereon, making a part of this specification.

Figure 1 is a perspective view of my windmill; Fig. 2, a vertical section of the flanged cylinder which supports the turn-table.

The object of my invention is to construct a self-regulating windmill that shall be more cheaply constructed than any other of equal efficiency.

In my invention I construct the main frame in any ordinary manner. I make the wind-wheel with ridged fans, and connect it with the frame through the medium of a common shaft, A, revolving in boxes B B, and having a crank, C, to connect with a pump-shaft, or with any other machinery which it is desired the windmill should drive. In the top of the frame I place a cylinder, D, so constructed that it projects far enough above the frame to form a sufficient pivot around which the turn-table E may revolve. The top of the frame should be made sufficiently smooth, either by placing thereon the turn-flange F or otherwise, so that it will make a proper seat for the bottom of the turn-table to rest upon. The cylinder D and the flange F may be cast in one piece, and turned where the surface joins the turn-table bearings, in which case, if properly bolted to the timbers, it forms an important element of strength to the main frame, of which it constitutes a part.

E is the turn-table. To the turn-table the boxes B B are rigidly attached, and to its forward end is also rigidly attached an arm, G, running horizontally and parallel with the plane of the wind-wheel, and to the end of the arm G, and beyond the periphery of the wind-wheel, is attached a small auxiliary vane, H.

J is the principal vane, and is connected to the turn-table by hinged joints K K. These joints are placed far enough apart to make a strong connection, and stand at a vertical angle of about sixty degrees from a horizontal line. A cord, L, is fastened to the large vane J, and passed through a hole, or staple, or roller in the arm G, and extends down so as to be reached by a person on the ground, and can be fastened to any device below. This cord is kept taut enough so that the vanes cannot be separated farther than about ninety degrees from each other.

The operation is as follows: When the windmill is in position and a fair wind blowing it will immediately turn so that the face of the wind-wheel will front toward the wind, and the machine will commence doing its intended work. When the wind gets too strong the small vane H will cause the turn-table to partially revolve, and thus throw the face of the wind-wheel a little out of the direct line of the wind, which will reduce the force of the wind upon it, and correspondingly reduce its motion. As the turn-table is thus partially revolved the wind will strike the side of the large vane J farthest from H, and thus force the large vane J to turn toward H. When this is done the inclined positions of the joints K K will cause J to rise upward as it turns toward H. As the wind again slackens the weight of J will cause it to fall to its original position, when the wind will blow it into the line of the current, and thus cause the wind-wheel to again face the wind directly.

It is thus readily seen that when the gravitating force of the large vane J is greater than the force of the wind upon the small vane H, the wind-wheel will face the wind directly, and when the force of the wind on H is greater than the gravitating force of J, then the wind-wheel will be turned partially away from the wind. The incline at which the wind-wheel will be turned away from the wind in such case will depend upon the relative power of the wind on H and the gravitating power of J, and the inclining of the wind-wheel from the wind will keep its speed uniform in a variable wind.

Any person skilled in the manufacture and use of windmills will understand the proper proportions and materials to be adopted in making the various parts of the machine, and also the entire machine.

The windmill may be stopped by drawing the vanes J and H toward each other by means of the cord L.

Having thus described my invention, what I claim, and desire to secure by Letters Patent, is—

The combination, with the wind-wheel, of the vane J, pivoted eccentrically to the turn-table, and the side vane, H, connected thereto, all substantially as set forth.

In testimony that I claim the foregoing I have hereunto set my hand this 19th day of October, 1877.

J. R. DIXON.

Witnesses:
J. M. MASON,
J. J. McCARTHY.